(12) United States Patent
Kim et al.

(10) Patent No.: US 10,899,859 B2
(45) Date of Patent: Jan. 26, 2021

(54) POLYETHYLENE RESIN COMPOSITION FOR INJECTION-MOLDING

(71) Applicant: LOTTE CHEMICAL CORPORATION, Seoul (KR)

(72) Inventors: Kyung Hoon Kim, Daejeon (KR); Sun Young Jung, Daejeon (KR); Dong Hoon Lee, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 159 days.

(21) Appl. No.: 15/762,774

(22) PCT Filed: Sep. 1, 2016

(86) PCT No.: PCT/KR2016/009806
§ 371 (c)(1),
(2) Date: Mar. 23, 2018

(87) PCT Pub. No.: WO2017/052096
PCT Pub. Date: Mar. 30, 2017

(65) Prior Publication Data
US 2019/0077892 A1    Mar. 14, 2019

(30) Foreign Application Priority Data

Sep. 23, 2015   (KR) .................. 10-2015-0134300

(51) Int. Cl.
| | |
|---|---|
| *C08F 210/16* | (2006.01) |
| *C08L 23/08* | (2006.01) |
| *C08L 23/06* | (2006.01) |
| *C08L 23/04* | (2006.01) |
| *B29C 45/00* | (2006.01) |
| *B29K 23/00* | (2006.01) |
| *B29L 31/56* | (2006.01) |

(52) U.S. Cl.
CPC ........ *C08F 210/16* (2013.01); *B29C 45/0001* (2013.01); *C08L 23/04* (2013.01);
(Continued)

(58) Field of Classification Search
CPC ............... C08L 23/0815; C08L 23/06; B29K 2023/025; B29K 2023/0625;
(Continued)

(56) References Cited

U.S. PATENT DOCUMENTS 6,608,116 B2 *   8/2003  Symons ................. B65D 39/00
                                                521/134
6,806,338 B2    10/2004  Baann et al.
(Continued)

FOREIGN PATENT DOCUMENTS

EP          2626911 B1 * 12/2015
JP       H10-077370 A    3/1998
(Continued)

OTHER PUBLICATIONS

Partial machine translation of KR 10-0901632 B1 (2019).*
(Continued)

*Primary Examiner* — Kregg T Brooks
(74) *Attorney, Agent, or Firm* — Paratus Law Group, PLLC

(57) ABSTRACT

Disclosed herein is a resin composition for injection-molding in which an ethylene-based resin is melt-mixed to be excellent in ductile property and impact property, excellent in environmental stress crack resistance, and low in an overall migration, and thus may be widely used as a food and drug container or a stopper. The present invention provides a resin composition for injection-molding formed by melt-mixing 80-90 wt % of a linear low density polyethylene having a melt flow index of 15-30 dg/min (190° C., 2.16 kg) and 10-20 wt % of an ethylene-alpha-olefin copolymer resin having a melt flow index of 10-20 wt %.

9 Claims, 1 Drawing Sheet

(52) U.S. Cl.
CPC ............ *C08L 23/06* (2013.01); *C08L 23/08* (2013.01); *C08L 23/0815* (2013.01); *B29K 2023/0625* (2013.01); *B29K 2023/08* (2013.01); *B29L 2031/56* (2013.01); *C08F 2500/04* (2013.01); *C08F 2500/08* (2013.01); *C08F 2500/12* (2013.01); *C08F 2800/10* (2013.01); *C08L 2205/025* (2013.01); *C08L 2207/06* (2013.01)

(58) Field of Classification Search
CPC ............ B29K 2023/08; B29L 2031/56; B29L 2031/565; C08F 110/02; C08F 210/16; C08J 2323/06; C08J 2423/08
See application file for complete search history.

(56) References Cited

U.S. PATENT DOCUMENTS

2012/0184657 A1* 7/2012 Lake, Jr. ................ C08K 3/20
524/414

2014/0171582 A1 6/2014 Wang et al.

FOREIGN PATENT DOCUMENTS

| | | |
|---|---|---|
| JP | H10-077371 A | 3/1998 |
| JP | 2014-189705 A | 10/2014 |
| KR | 10-2001-0103806 A | 11/2001 |
| KR | 10-0505557 B1 | 8/2005 |
| KR | 10-0821427 B1 | 4/2008 |
| KR | 10-0901632 B1 | 6/2009 |
| KR | 10-2014-0002351 A | 1/2014 |
| KR | 10-2015-0094663 A | 8/2015 |

OTHER PUBLICATIONS

Japanese Office Action for related JP Application No. 2018-515870 dated Mar. 19, 2019 from Japanese Patent Office.
International Search Report for PCT/KR2016/009806 dated Dec. 16, 2016 from Korean Intellectual Property Office.

* cited by examiner

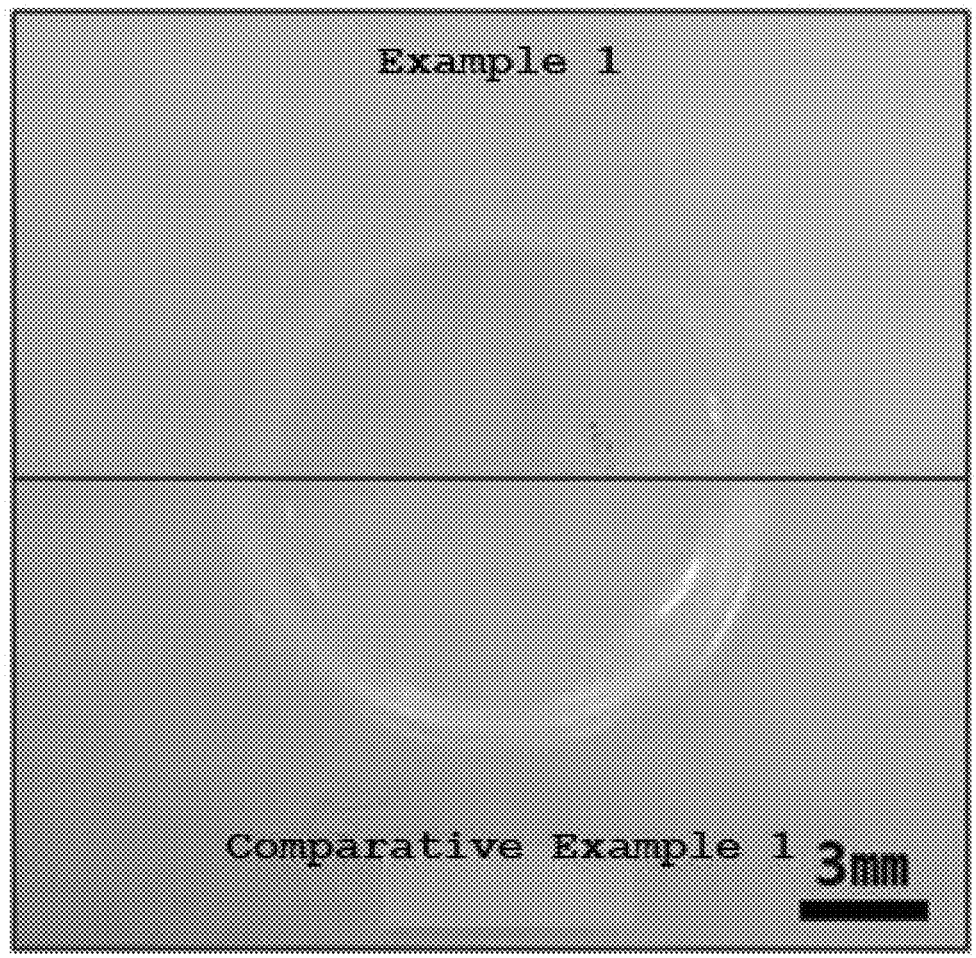

POLYETHYLENE RESIN COMPOSITION FOR INJECTION-MOLDING

CROSS REFERENCE TO PRIOR APPLICATIONS

This application is a National Stage Patent Application of PCT International Patent Application No. PCT/KR2016/009806 (filed on Sep. 1, 2016) under 35 U.S.C. § 371, which claims priority to Korean Patent Application No. 10-2015-0134300 (filed on Sep. 23, 2015), which are all hereby incorporated by reference in their entirety.

TECHNICAL FIELD

The present invention relates to a polyethylene resin composition, and more particularly, to a polyethylene resin composition for injection-molding.

BACKGROUND ART

At present, a low density polyethylene or a linear low density polyethylene is being used alone or as a mixture in the manufacture of a general food and drug storage container or a stopper. Products manufactured by using polyethylene are being used widely in general due to the excellent moldability, good low temperature impact strength, and low cost thereof. However, products widely sold and used at present have a disadvantage that low molecular weight materials, etc. included in the resin composition are migrated to the contents when used at a high temperature, and polyethylene tends to become hard when stored at a low temperature, resulting in poor opening and closing property.

In particular, a closed container stopper is being manufactured by using high flow linear low density polyethylene, high flow low density polyethylene, or a resin in which the two materials are physically mixed. However, in the existing material, the properties required by molded products may not be satisfied, the uniformity of products is low due to shortage of dispersibility even when using physically mixed products, the impact and closed properties required by the molded products are not satisfied due to the low ductile property thereof, and whitening occurs when the molded products receive a certain stress or more. Particularly, the physically mixed products have very low environmental stress crack resistance (ESCR), which may make it difficult to be used under a continuous stress environment.

Korean Patent Registration No. 0505557 discloses a rubber composition for manufacturing a vial stopper, the rubber composition being composed of a halogenated butyl rubber as a main ingredient and being a non-sulfur non-toxin vulcanizing system without using a vulcanization accelerator. However, the rubber composition may cause migration or harmful problems due to a paraffin wax, a sulfur ingredient or the like.

Korean Patent Registration NO. 0821427 discloses a method for using in the lids of a food container and a Kimchi-refrigerator container by mixing a random polypropylene with an ethylene-alpha-olefin copolymer and a low density polyethylene. However, due to ethylene-alpha-olefin included in a high amount, the method may cause problems that moldability (flowability) is poor and low molecular weight materials are migrated from the molded products to the food.

Korean Patent Registration No. 0901632 discloses a method for reducing migration of low molecular weight materials by mixing a linear low density polyethylene with alpha-olefin-elastomer, and improving closing and opening properties. However, the elusion amount does not satisfy the standard of European Commission Regulation (EU) No 10/2011, so that there are fields that are difficult to apply.

DISCLOSURE OF THE INVENTION

Technical Problem

The present invention provides a resin composition for injection-molding in which an ethylene-based resin is melt-mixed, thus being excellent in ductile property, impact property and environmental stress crack resistance, and an overall migration may be low to be widely used as a food and drug container or a stopper.

Technical Solution

The present invention provides a resin composition for injection-molding formed by melt-mixing 80-90 wt % of a linear low density polyethylene resin having a melt flow index of 15-30 dg/min (190° C., 2.16 kg) with 10-20 wt % of an ethylene-alpha-olefin copolymer resin having a melt flow index of 25-40 dg/min (190° C., 2.16 kg).

In addition, there is provided a resin composition for injection-molding, wherein the linear low density polyethylene resin is an ethylene homopolymer or a copolymer of ethylene with 1-butene or isopentene, and has a density of 0.915-0.930 g/cm$^3$ and a polydispersity index (PDI) of 3 to 6.

In addition, there is provided a resin composition for injection-molding, wherein the ethyl-alpha-olefin copolymer resin is composed of alpha-olefin having 3 to 8 carbon atoms, and has a density of 0.860-0.880 g/cm$^3$.

In addition, there is provided a resin composition for injection-molding, wherein the alpha-olefin is 1-butne, 1-hexene, or 1-octene, and the ethylene is included in an amount of 70-90 mol %.

In addition, there is provided a resin composition for injection-molding, wherein the resin composition has a melt flow index of 20-30 dg/min (190° C., 2.16 kg) and a density of 0.914-0.920 g/cm$^3$.

In addition, there is provided a resin composition for injection-molding, wherein the resin composition has a flexural modulus of 2,000-3,000 MPa and a shore D hardness of 30 to 40.

In addition, there is provided a resin composition for injection-molding, wherein the resin composition has an overall migration of less than 10 mg/dm$^2$.

In addition, there is provided a closed container stopper manufactured by injection-molding the resin composition.

Advantageous Effects

A resin composition according to the present invention has high flowability which is highly advantageous for injection-molding, and has an excellent ductile property which is excellent in deformation caused by low temperature storage and in resistance to external impact.

In addition, by applying a melt-kneading method, product uniformity is high and the environmental stress crack resistance is very high, and thus the resin composition may be used for a long time in a severe environment. Also, a low molecular weight material migration level, which exhibits high in a high temperature or in a specific chemical environment, is low even in actual injection-molding products.

BRIEF DESCRIPTION OF THE DRAWINGS

FIG. 1 is a photograph showing a result of observing a whitening phenomenon according to a DuPont impact test on the resin composition manufactured according to Example 1 and Comparative Example 1 of the present invention.

MODE FOR CARRYING OUT THE INVENTION

Hereinafter, the preferred embodiments of the present invention are described in detail. In describing the present invention, a detailed explanation will not be provided herein when it is determined that a concrete explanation on the related known technology can make the gist of the present invention unclear. Throughout the specification, when an element is referred to as "including", it means that it may include other elements as well, without excluding other elements, unless specifically stated otherwise.

The present invention discloses a resin composition for injection-molding in which the ethylene-alpha-olefin copolymer as a modifier is added to the linear low density polyethylene resin in a predetermined amount through a melt-mixing method to improve the properties of the linear low density polyethylene resin, and 80-90 wt % of a linear low density polyethylene resin having a melt flow index of 13-30 dg/min (190° C., 2.16 kg) and 10-20 wt % of an ethylene-alpha-olefin copolymer resin having a melt flow index of 25-40 dg/min (190° C., 2.16 kg) are melt-mixed.

In the present invention, the linear low density polyethylene resin may be an ethylene homopolymer or may be obtained by copolymerizing ethylene with 1-butene or isopentene. In this case, the linear low density polyethylene resin may be produced by using a Ziegler-Natta catalyst, and a production method of the linear low density polyethylene resin may use, for example, a vaporization method, a solution method, a slurry method, etc., and is not particularly limited as long as being known in the art, but the vaporization method is preferable to be used.

The linear low density polymer resin may have a melt flow index (ASTM D1238, 190° C., 2.16 kg load) of 15-30 dg/min, preferably 20-25 dg/min. when the melt flow index is less than dg/min, the moldability is deteriorated, and when the moldability is more than 30 dg/min, the amount of low molecular weight materials eluted at a high temperature may be increased.

In addition, the density of the linear low density polyethylene resin is preferably 0.915-0.930 g/cm$^3$, more preferably 0.920-0.925 g/cm$^3$. When the density is less than 0.915 g/cm$^3$, deformation may be occurred at a high temperature when manufactured with a container stopper and the elution amount of low molecular weight materials may be increased, and when the density is more than 0.930 g/cm$^3$, the opening and closing property of the container stopper may be deteriorated at a low temperature.

In addition, the linear low density polyethylene resin preferably has a polydispersity index (PDI) of 3-6, more preferably 3.5-5.5. When the polydispersity index is less than 3, the ductile property and environmental stress crack resistance thereof may be insufficiently exhibited, and when the polydispersity index is more than 6, the resistance to the external impact may be deteriorated.

The linear low density polyethylene resin is included in an amount of 80-90 wt %. When the amount of the linear low density polyethylene resin is less than 80 wt %, injection-molding properties may be deteriorated, and when the amount is more than 90 wt %, the rigidity of the product is excessive, and thus the opening and closing property may be deteriorated when manufactured with a container stopper.

In the present invention, the ethylene-alpha-olefin copolymer resin is a copolymer produced by using a monomer of ethylene and alpha-olefin as a comonomer, which in consideration of the ductile property and environmental stress crack resistance of the product when injection-molded with the final resin composition, the alpha-olefin may be selected from alpha-olefin having 3 to 8 carbon atoms, and more preferably 1-butene, 1-hexene or 1-octene, even more preferably 1-hexene or 1-octene. In this case, when ethylene is included in an amount of 70-90 mol % in a copolymer resin composed of ethylene with 1-butene, 1-hexene or 1-octene, the ductile property and environmental stress crack resistance of injection products are most excellent.

Such an ethylene-alpha-olefin copolymer resin may have a melt flow index (ASTM D1238, 190° C., 2.16 kg load) of 25-40 dg/min, preferably 30-35 dg/min. When the melt flow index is less than 25 dg/min, the moldability is deteriorated, and when the melt flow index is more than 40 dg/min, the amount of low molecular weight materials eluted at a high temperature may be increased.

In addition, the density of the ethylene-alpha-olefin copolymer resin is preferably 0.860-0.880 g/cm$^3$, more preferably 0.865-0.875 g/cm$^3$. When the density is less than 0.860 g/cm$^3$, it is not preferable in view of the production cost, and when the density is more than 0.880 g/cm$^3$, the ductile property of injection-molding products may be deteriorated.

The ethylene-alpha-olefin copolymer resin is included in an amount of 10-20 wt %. When the amount of the ethylene-alpha-olefin copolymer resin is less than 10 wt %, the ductile property and environmental stress crack resistance thereof may be exhibited insufficiently, and when the amount is more than 20 wt %, the result of the overall migration may be more than the standard and the usage field may be limited.

The resin composition produced by melt-mixing the linear low density polyethylene resin with the ethylene-alpha-olefin copolymer resin described above may have a melt flow index of 20-30 dg/min (190° C., 2.16 kg), preferably 22-27 dg/min. In addition, the density thereof may be 0.914-0.920 g/cm$^3$. The resin composition according to the present invention is advantageous for injection-molding within the range of the melt flow index and the density.

The resin composition for injection-molding according to the present invention has a flexural modulus of 2,000-3,000 MPa and a shore D hardness of 30-40. Also, the result of a low-temperature (−30° C.) DuPont impact test shows more than 200 kg-cm, and thus the ductile property and impact property thereof are very excellent. Additionally, the results of the overall migration according to the standard of the European Commission Regulation (EU) No 10/2011 are less than 10 mg/dm$^2$ each, which may be used particularly suited for a food and drug container or a stopper.

Meanwhile, the resin composition according to the present invention may be produced through a known melt-mixing process, and is not particularly limited to the melt-mixing process conditions as long as being in the conditions in which the dispersibility of the linear low density polyethylene resin and the ethylene-alpha-olefin copolymer resin may be smoothly realized.

As described above, materials produced from conventional high flow linear low density polyethylene or high flow low density polyethylene have a low ductile property and may not satisfy the impact and sealing properties required by molded products, and when the molded products is subjected to a stress of any value or more, whitening occurs, and particularly, the physically mixed products had a problem that the environmental stress crack resistance (ESCR) thereof was very low. However, the resin composition for injection-molding according to the present invention has very high dispersibility through the melt-mixing process, and not only the ductile property thereof may be uniformly provided through a modifier, but also the environmental stress crack resistance thereof is very high, and thus may be used for a long time even in a severe environment. In particular, the results of the overall migration of the European Commission Regulation (EU) No 10/2011, which measures the amount to be migrated per unit area by being eluted for 10 days in an 3% aqueous solution of acetic acid at 40° C., for 10 days in an 95% aqueous solution of ethanol at 40° C., and for 2 days in isooctane at 20° C., all exhibit less than 10 mg/dm$^2$, so that the resin composition for injection-molding produced according to the present invention may be used by being particularly suited for a food and drug container or a stopper.

Hereinafter, the present invention will be described in more detail with reference to Examples and Comparative Examples.

Example 1

A resin composition was produced in the form of a pellet through a melt-mixing method under a condition of 180° C. to 230° C. in a composition of 80 wt % of a linear low density polyethylene resin (ethylene homopolymer, melt flow index 23 dg/min (190° C., 2.16 kg), density 0.925 g/cm$^3$, polydispersity index 4.5) and 20 wt % of an ethylene-alpha-olefin copolymer (random copolymer of ethylene and 1-octene, ethylene amount 80 mol %, melt flow index 30 dg/min (190° C., 2.16 kg, density 0.870 g/cm$^3$).

Example 2

A resin composition was produced in the same manner as in Example 1, except that the linear low density polyethylene resin was adjusted to an amount of 90 wt % and the ethylene-alpha-olefin copolymer was adjusted to an amount of 10 wt % in Example 1.

Example 3

A resin composition was produced in the same manner as in Example 1, except that an ethylene-alpha-olefin copolymer (random copolymer of ethylene and 1-hexene, ethylene amount 80 mol %, melt flow index 32 dg/min (190° C., 2.16 kg, density 0.870 g/cm$^3$) was used in Example 1.

Example 4

A resin composition was produced in the same manner as in Example 1, except that the ethylene-alpha-olefin copolymer (random copolymer of ethylene and 1-butene, ethylene amount 80 mol %, melt flow index 35 dg/min (190° C., 2.16 kg, density 0.870 g/cm$^3$) was used in Example 1.

Example 5

A resin composition was produced in the same manner as in Example 1, except that the linear low density polyethylene resin having polydispersity of 2 was used in Example 1.

Example 6

A resin composition was produced in the same manner as in Example 1, except that the linear low density polyethylene resin having a polydispersity index of 7 was used in Example 1.

Comparative Example 1

A resin composition was produced in the same manner as in Example 1, except that the linear low density polyethylene resin was adjusted to an amount of 50 wt % and the low polyethylene resin (ethylene homopolymer, melt flow index 55 dg/min (190° C., 2.16 kg, density 0.914 g/cm$^3$) was adjusted to an amount of 50 wt % in Example 1.

Comparative Example 2

A resin composition was produced in the same manner as in Example 1, except that the linear low density polyethylene resin was adjusted to an amount of 100 wt % in Example 1.

Experimental Example

Physical properties of the resin compositions prepared according to Examples and Comparative Examples were measured by the following methods, and the results thereof were shown in Table 1 below.

[Measurement Method]

1) Melt Flow Index

The melt flow index was measured according to ASTM D1238, and the measuring conditions thereof were 190° C. and 2.16 kg.

2) Density

The density was measured according to ASTM D1505. A specimen was compression-molded at 150° C. for 7 minutes at a pressure of 0.25 tons and for 3 minutes at a pressure of 13.5 tons, and then was cooled for 40 minutes at 75° C., thus being prepared.

3) Flexural Modulus

The flexural modulus was measured according to ASTM D790. A specimen was 127×12.7×6.4 mm in size, and a speed of 28 mm/min was used.

4) Hardness (Shore D)

The harness was measured according to ASTM D2240. A specimen was a flat plate specimen having a thickness of 6 mm.

5) Environmental Stress Crack Resistance (ESCR)

The environmental stress crack resistance was measured according to ASTM D1693, and the time ($F_{50}$ hr) at which 50% cracking due to environmental stress occurred in a Igepal 10 wt % aqueous solution was measured.

6) DuPont Impact Test

The value of the DuPont impact test was measured according to ASTM D2794 and was evaluated for an actual closed container stopper injection-molding product having a thickness of 1.7 mm at −30° C. Further, for Example 1 and Comparative Example 1, a flat plane specimen having a thickness of 2 mm was injected, and a whitening phenomenon was visually evaluated at room temperature.

7) Overall migration

The results of the overall migration were measured according to European Commission Regulation (EU) No 10/2011, which measures the amount to be migrated per unit area eluted for 10 days in 3% of an acetic acid aqueous solution at 40° C., for 10 days in 95% of an ethanol aqueous solution at 40° C., and for 2 days in isooctane at 20° C.

TABLE 1

| Classification | Linear low density polyethylene wt % | Low density polyethylene wt % | Ethylene-alpha-olefin copolymer wt % | Melt flow index dg/min | Density g/cm³ | Flexural modulus kgf/cm² | Shore D hardness — | DuPont (−30° C.) Kg · cm· | ESCR $F_{50}$hr | Whitening phenomenon — | Overall migration mg/dm² |
|---|---|---|---|---|---|---|---|---|---|---|---|
| Example 1 | 80[1] | — | 20[4] | 24.5 | 0.914 | 2,470 | 36 | >200 | >2,000 | Not occurred | 4 |
| Example 2 | 90[1] | — | 10[4] | 23.4 | 0.919 | 2,930 | 40 | 150 | 1,500 | Not occurred | 6 |
| Example 3 | 80[1] | — | 20[5] | 24.1 | 0.918 | 2,680 | 38 | >200 | >2,000 | Not occurred | 5 |
| Example 4 | 80[1] | — | 20[6] | 25.6 | 0.915 | 2,196 | 35 | 150 | 500 | Not occurred | 10 |
| Example 5 | 80[2] | — | 20[4] | 21.5 | 0.913 | 2,050 | 42 | >200 | 100 | Not occurred | 8 |
| Example 6 | 80[3] | — | 20[4] | 26.8 | 0.920 | 3,040 | 33 | 100 | >2,000 | Not occurred | 10 |
| Comparative Example 1 | 50[1] | 50 | — | 28.4 | 0.920 | 2,480 | 42 | 65 | 2 | Occurred | — |
| Comparative Example 2 | 100[1] | — | — | 22.7 | 0.925 | 3,560 | 45 | 120 | 10 | Occurred | — |

* Note
[1] Polydispersity index 4.5
[2] Polydispersity index 2
[3] Polydispersity index 7
[4] Random copolymer of ethylene and 1-octene
[5] Random copolymer of ethylene and 1-hexene
[6] Random copolymer of ethylene and 1-butene Referring to Table 1 and FIG. 1, in the case of using the resin composition produced by melt-mixing a linear low density polyethylene resin with an ethylene-alpha-olefin copolymer having a specific composition according to the present invention, it may be ascertained that the ductile property thereof is superior to that of the resin composition (Comparative Examples and 2) applied at present, the deformation caused by low temperature storage and the resistance to external impact are excellent, the whitening phenomenon does not also occur, the environmental stress crack resistance is very high, thus being possible to be used for a long time in a severe environment, and the migration level of low molecular weight materials which exhibit high in a high temperature or in a specific chemical material environment also exhibits in 10 mg/dm² or less even in actual injection-molding products.

On the other hand, it may be seen that the alpha-olefin of an ethylene-alpha-olefin copolymer is more preferable to apply 1-octene or 1-hexene rather than 1-butene (Example 4) in view of balance of physical properties, and when the polydispersity index of the linear low density polyethylene resin is out of the range of 3 to 6 (Examples 5 and 6), the overall migration index and the impact property thereof are somewhat lowered.

As described above, the preferred embodiments of the present invention have been described in detail. The description of the present invention is intended to be illustrative, and it will be understood by those skilled in the art that various changes in form and details may be made therein without departing from the spirit and scope of the invention as defined by the appended claims.

Therefore, the scope of the present invention is defined by the appended claims rather than the foregoing detailed description, and all changes or modifications that come within the meaning and range of equivalency of the claims, and equivalents thereof, are to be construed as being included within the scope of the present invention.

The invention claimed is:

1. A resin composition for injection-molding formed by melt-mixing 80-90 wt % of a linear low density polyethylene resin having a melt flow index of 15-30 dg/min (190° C., 2.16 kg) with 10-20 wt % of an ethylene-alpha-olefin copolymer resin having a melt flow index of 25-40 dg/min (190° C., 2.16 kg),
   wherein the ethylene-alpha-olefin copolymer resin is composed of alpha-olefin having 3 to 8 carbon atoms, and has a density of 0.860-0.880 g/cm³,
   wherein the alpha-olefin is 1-hexene or 1-octene, and the ethylene is included in an amount of 70-90 mol %,
   wherein the resin composition has an overall migration of less than 10 mg/dm² measured in accordance with European Commission Regulation (EU) No 10/2011, and has an ESCR of at least 1,500 $F_{50}$ hr measured in accordance with ASTM D1693 where $F_{50}$ hr is a time at which 50% cracking due to environmental stress occurs in a 10 wt % aqueous solution of reagent.

2. The resin composition for injection-molding of claim 1, wherein the linear low density polyethylene resin is an ethylene homopolymer or a copolymer of ethylene with 1-butene or isopentene, and has a density of 0.915-0.930 g/cm³ and a polydispersity index (PDI) of 3 to 6.

3. A closed container stopper manufactured by injection-molding the resin composition of claim 2.

4. The resin composition for injection-molding of claim 1, wherein the resin composition has a melt flow index of 20-30 dg/min (190° C., 2.16 kg) and a density of 0.914-0.920 g/cm³.

5. A closed container stopper manufactured by injection-molding the resin composition of claim 4.

6. The resin composition for injection-molding of claim 1, wherein the resin composition has a flexural modulus of 2,000-3,000 MPa and a shore D hardness of 30 to 40.

7. A closed container stopper manufactured by injection-molding the resin composition of claim 6.

8. A closed container stopper manufactured by injection-molding the resin composition of claim 1.

9. The resin composition for injection-molding of claim 1, wherein the sum of the wt % of the linear low density polyethylene resin and the wt % of an ethylene-alpha-olefin copolymer resin is 100 wt %.

* * * * *